United States Patent [19]

Lalwani et al.

[11] Patent Number: 4,917,764

[45] Date of Patent: Apr. 17, 1990

[54] BINDER FOR IMPROVED GLASS FIBER MATS

[75] Inventors: Steven S. Lalwani, Upper Montclair, N.J.; Philip J. Halpin, Rock Hill, S.C.

[73] Assignee: GAF Building Materials Corporation, Wayne, N.J.

[21] Appl. No.: 282,818

[22] Filed: Dec. 12, 1988

[51] Int. Cl.[4] .................... B32B 17/02; D04H 1/64; D21H 3/40; D21H 3/52
[52] U.S. Cl. .................................. 162/156; 162/166; 162/169; 428/290; 428/291; 428/307.3; 428/311.5; 428/436; 428/441; 428/489
[58] Field of Search ................ 162/156, 166, 169; 428/290, 311.5

[56] References Cited

U.S. PATENT DOCUMENTS 4,258,098 3/1981 Bondoc .................... 428/290

Primary Examiner—James C. Cannon
Attorney, Agent, or Firm—Marilyn J. Maue; Joshua J. Ward

[57] ABSTRACT

A glass fiber mat having improved strength and fiber wettability is provided by incorporation of a critical amount of between 1% and 6% by weight (solids) of a carboxylated styrene-butadiene latex having a pH between about 5 and about 8.5, a glass transition temperature (Tg) less than 25° C. and a surface tension less than 50 dynes/cm, and 94% and 99% by weight (solids) of a urea-formaldehyde resin solution having a pH of from about 6.5 to about 8.5.

17 Claims, No Drawings

BINDER FOR IMPROVED GLASS FIBER MATS

BACKGROUND OF THE INVENTION

In the manufacture of glass fiber mats, many blends and mixtures involving urea-formaldehyde resins have been used as binders to fix glass fibers and lend strength in the mat product. One such blend comprises a mixture of urea-formaldehyde resin with a mixture of styrene-butadiene latex and an acrylamide as described in U.S. Pat. No. 4,258,098. While this binder blend provides mats of high tensile strength, their flexibility at mandrel diameters (MD) of 100 mm or less fail to meet specifications. Specifically at MD 100 mm or less, the mat is subject to cracking and crumbling which is a serious falling in applications where the mat is employed as a base in asphalt roofing shingles, as a backing felt or as a base support for sheet vinyl flooring. Additionally, it is found that certain acrylamides are incompatible with dispersion aids employed in the formation of glass fiber slurries preliminary to matting. These are generally subject to gelation and cause plugging of process lines and pumping difficulties.

It has also been noted that the binder composition of the above patent lacks the desired wettability for commercial applications where a web of mat fiber is conveyed past the point of binder application at high speeds allowing less than 10 seconds for wettability. In such operations the binder is unevenly deposited on the surface of the mat causing objectionable non-uniform mat strength and porosity. Finally, the low pH, less than 5, of these latexes causes premature reaction leading to cross-linking, phase separation and gelation which contribute to binder voids in the mat and non-uniform binder distribution resulting in poor mat strength.

Accordingly it is an object of this invention to provide a binder for glass fiber mats which has greatly improved flexibility and wettability and which is compatible with known dispersion aids.

Another object of this invention is to provide a binder having the above properties with enhanced mat tensile strength.

Another object is to provide a binder composition which is readily incorporated and uniformly distributed on the surface of a glass fiber mat and which is ideally suited for use as a backing felt or base support in roofing or flooring.

Still another object of this invention is to provide a simplified process for binding glass fibers in a mat which is commercially feasible and which requires less care in formulating.

These and other objects of the invention will become apparent to those skilled in the art from the following description and disclosure.

THE INVENTION

The above stated objects and features of the invention are accomplished herein by providing a glass fiber mat composed of a plurality of glass fibers held together by an improved binder composition comprising between about 94% and 99% by weight solids of urea-formaldehyde resin and form 1% to not more than 6% by weight solids of a styrene-butadiene latex copolymer, preferably between about 2% and about 5% of the latex copolymer.

The glass mats of this invention are prepared by applying the binder composition to the wet glass mat and drying and curing the binder at an elevated temperature. The finished glass mat product contains between about 60% and about 90% by weight glass fibers and between about 10% and about 40% by weight of binder, of which not more than 6% is styrene-butadiene latex having a pH of from about 5 to about 8.5, a Tg less than 25° C., and a surface tension less than 50 dynes/cm.

A more detailed description of the invention is directed to a wet-laid process for preparing glass fiber mats, although it will be understood that other processes known in the art such as dry-laid process, may be used as well. The following description particularizes chopped bundles of glass fibers, although other forms of glass fibers such as continuous strands, and the like may also be used.

The process of forming glass fiber mats begins with chopped bundles of glass fibers of suitable length and diameter. Generally, fibers having a length of about ¼ inch to 3 inches and a diameter of about 3 to 20 microns are used. Each bundle may contain from about 20 to 300, or more, of such fibers, which may be sized or unsized, wet or dry, as long as they can be suitably dispersed in an aqueous dispersant medium. The bundles are added to the dispersant medium to form an aqueous slurry. Any suitable dispersant known in the art e.g. polyacrylamide, hydroxyethyl cellulose, ethoxylated amines, and amine oxides, may be used. The dispersant is employed in relatively small amounts, e.g. 0.2–10 parts in 10,000 parts of water. The fiber slurry then is agitated to form a workable dispersion at a suitable consistency. The dispersion then is passed to a mat-forming machine containing a mat forming screen. En route to the screen, the dispersion usually is diluted with water to a lower fiber concentration.

The fibers are collected at the screen in the form of a wet fiber mat and the excess water is removed by vacuum in the usual manner. The wet mat is then ready for application of the binder composition thereto, which is accomplished by soaking the mat in an excess of binder solution, or by coating the mat surface by means of a binder applicator, and dewatering under vacuum, to remove excess binder solution. The mat then is dried and the incorporated binder composition is cured in an oven at elevated temperatures, generally at a temperature of at least about 200° C. This heat treatment alone will effect curing; alternatively, but less desirable, catalytic curing may be used, such as is accomplished with an acid catalyst, e.g. ammonium chloride or p-toluene sulfonic acid.

The binder composition of the invention is prepared by blending a urea-formaldehyde resin having a pH of from about 6 to about 8.5 with a carboxylated or non-carboxylated styrene-butadiene latex copolymer in the absence of an acrylamide modifier although small amounts of other monomers, such as carboxylic acids, e.g. methacrylic, fumaric or itaconic acid, also may be present, if desired, in the styrene-butadiene latex copolymer. When present, the concentration of these acids is usually below about 1% of the latex component. The latex also may contain a bactericide and/or stabilizer as emulsion preservatives.

Importantly, the styrene-butadiene rubber latex has a glass transition (brittleness) temperature less than 25° C., preferably between about 10° C. an about 25° C., a pH of 5 or more, preferably between about 6 and about 7.5, and a surface tension less than 50 dynes/cm. A commercial latex that meets the above criteria is a carboxylated latex supplied by Dow Chemical Co., designated as Dow DL-246A or DL-245A.

The urea-formaldehyde resins of the binder composition also are commercially available materials, for example, urea-formaldehyde resins such as the types sold by Georgia Pacific Corp. for glass mat application and those sold by Borden Chemical Co., may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene; N,N'-dimethylolethylene and the like.

The resin and latex copolymer components of the binder composition are quite compatible. Accordingly, they are intimately admixed in aqueous solution to form a stable uniform emulsion which does not become gummy, or gel, even after prolonged storage, e.g. for periods of a week or longer, which is advantageous in practical commercial use of the composition. The present binder is particularly adapted to commercial operations where the binder material is continuously applied to a sheeting of webbed glass fibers moving at high speeds on a conveyer past the point of binder application. The superior wettability of the present binder composition permits continuous and uniform application of binder to the surface of the mat which is free of lumps and other irregularities and provides excellent adhesion to the fibers. The present binder composition also possesses high resistance to foaming so that coatings are free of air bubbles and a more continuous composition is applied.

The amount of the applied coating can vary between about 10% and about 40%, by weight of glass mat, preferably between about 15% and about 30%, by weight, to provide a glass mat product of significantly increased fiber wettability, resistance to gelation, flexibility and excellent fiber fixation, with substantial improvement in tensile strength. The binder is added to hold the fibers together and must be uniformly distributed so as to positionally fix the fibers in the mat. Accordingly, the binder is a cohesive coating which remains on the surface of the mat or it can permeate the structure between fibers depending on the viscosity of the material applied. Generally the binder of this invention is applied as an aqueous solution of between about 10% and about 40% solids concentration, preferably between about 15% and about 30% solids concentration. The mat thickness of the finished product is generally about 0.3 or more millimeters.

The following example will illustrate the invention with more particularity, but are not to be construed as limiting to the scope thereof as is more broadly defined in the foregoing description and in the appended claims.

EXAMPLES 1-6

In a plant run, about 34 kg./min. (dry basis) of chopped bundles of glass fibers having a length of about 1.25 inch and a diameter of 13 microns were dispersed with agitation in water containing dispersant to a fiber consistency of 0.5% by weight fibers. The resulting aqueous slurry was then diluted with water to a fiber content of 0.05% by weight and then formed into a wet glass mat by passing the dispersed fibers onto a wire mesh with vacuum applied to remove excess water. The moisture content of the wet mat was about 40%.

Six blender compositions were prepared by adding 0.1 to 3 gallons/min. of styrene-butadiene latex copolymer emulsion and 6 to 11 gallons/min. of urea-formaldehyde resin to a 700 gallon tank and diluting with 4 to 15 gals/min. of water to a 20% by weight solids content solution, i.e. between 0.8% and 20% styrene-butadiene and 99.2 to 80% urea-formaldehyde. The pH of the six binder compositions were about 7.3.

The above buffer compositions were then added to a reservoir having an outlet from which the binder solution was poured onto the surface of the mat formed on the wire mesh and excess binder was removed by applying vacuum beneath the mesh supported mat. The application of binder can be effected at a temperature of from about 15° C. to about 35° C.; although room temperature was employed in all of these examples. The resultant wet glass mats, with binder applied, contained about 36% by weight glass fibers, 14% binder and 50% water.

The wet glass mats were then conveyed through a dryer at 100°-260° C. and cured at 300°-320° C. It will be understood that higher or lower drying and curing temperatures can be employed without departing from the scope of this invention. For example drying temperatures between about 100° and about 280° C., and curing temperatures of between about 250° and about 400° C. are suitable. The resultant dry glass mats contained about 28% by weight binder and had a base weight of 75 g.m$^2$.

The physical properties of the finished glass mat are reported in Table I.

TABLE I

| | MAT PHYSICAL PROPERTIES | | | | | | |
|---|---|---|---|---|---|---|---|
| Ex. | (A) | (B) | (C) | (D) | (E) | (F) | (G) |
| 1 | 20 | 75.8 | 28.3 | 784 | 3.8 | 8 | 0.54 |
| 2 | 10 | 77.6 | 28.3 | 698 | 4.3 | 10 | 0.59 |
| 3 | 5 | 75.2 | 28.3 | 570 | 3.9 | 10 | 0.63 |
| 4 | 2 | 75.5 | 28.5 | 524 | 3.7 | 11 | 0.66 |
| 5 | 0.8 | 75.4 | 28.2 | 497 | 5.0 | 32 | 0.72 |
| 6 | 0 | 76.2 | 27.8 | 472 | 4.7 | 52 | 0.65 |

(A) = Percent substitution of urea-formaldehyde with latex
(B) = Mat basis weight in grams per square meter
(C) = Weight loss on ignition = mat binder content in percent
(D) = Total tensile strength (machine direction + cross machine direction) Newtons per 50 mm
(E) = Tear strength in Newtons
(F) = MIT fold in number of folds to failure
(G) = Mat thickness in millimeters The criticality of the 1 to 6% substitution of urea-formaldehyde with styrene-butadiene latex is apparent from the above examples. Specifically, Example 4 shows a significant increase in tensile strength over unsubstituted binder and binder containing only 0.8% latex. Conversely, binder containing 10% and 20% latex (Examples 1 and 2) formed gels and produced non-uniform cohesion to the mat and mat fibers, whereas the compositions of Examples 3-6 avoided this problem.

What is claimed is:

1. A glass fiber mat having improved strength and wettability properties comprising a plurality of glass fibers disposed as a mat and a binder to hold said fibers in position, said binder consisting essentially of between about 94% and about 99% by weight of urea-formaldehyde resin and from 1% to not more than 6% by weight of a styrene-butadiene latex copolymer.

2. The glass fiber mat of claim 1 wherein said styrene-butadiene latex copolymer is between about 2% and about 5% by weight of the binder composition.

3. The glass fiber mat of claim 1 wherein said latex has a Tg less than 25° C. and a pH of from about 5 to about 8.5.

4. The glass fiber mat of claim 3 wherein said latex has a surface tension less than 50 dynes/cm.

5. The glass fiber mat of claim 1 having a total tensile strength (machine direction +cross machine direction) of at least 400 Newtons per 50 mm width.

6. The glass mat of claim 1 wherein said latex is a carboxylated styrene/butadiene latex having a Tg between about 10° C. and about 25° C.; a pH of from about 6 to about 7.5 and a surface tension between about 30 and about 47 dynes/cm.

7. The glass mat of claim 1 wherein the resin is a nonionic aqueous solution of urea-formaldehyde resin having a pH of between about 6 and about 8.5.

8. The glass fiber mat of claim 1 wherein said binder is deposited on the surface of the mat and permeates the fiber structure.

9. The glass fiber mat of claim 8 wherein the amount of binder is between about 15% and about 30% on the surface of the mat.

10. A glass fiber mat according to claim 1 wherein said binder is cured on said mat.

11. A glass fiber mat according to claim 10 wherein said curing is effected by heating the dried glass mat to temperatures of between about 250° C. and about 450° C.

12. A glass fiber mat according to claim 1 which contains between about 60% and about 90% by weight of glass fibers and between about 40% and about 10% by weight of said binder.

13. A glass fiber mat according to claim 1 further characterized by having a porosity sufficient to allow impregnation of asphalt therein.

14. A method of making an improved glass fiber mat which comprises forming said glass fibers into a wet mat, applying said binder composition of claim 1 thereto, drying and curing said binder at elevated temperatures.

15. The method of claim 14 wherein said binder is applied to said mat at ambient temperature, the resulting composition is dried at a temperature of from about 100° C. to about 260° C. and then cured at a temperature between about 200° C. and about 400° C.

16. The method of claim 14 wherein said binder composition is an aqueous solution containing between about 10% and about 40% solids.

17. The method of claim 14 wherein the binder is cured at a temperature of between about 300° C. and about 320° C.

* * * * *